United States Patent [19]

Hawkins, Jr.

[11] Patent Number: 4,970,760
[45] Date of Patent: Nov. 20, 1990

[54] GOLF CART ACCESSORY CLAMP

[76] Inventor: William A. Hawkins, Jr., 432 N. 4th St., Cocoa Beach, Fla. 37931

[21] Appl. No.: 417,318

[22] Filed: Oct. 5, 1989

[51] Int. Cl.⁵ .......................... A44B 21/00; G09F 3/18
[52] U.S. Cl. ................................. 24/3 R; 24/30.5 R; 224/918
[58] Field of Search .............. 24/3 R, 3 A, 10 R, 15, 24/20 R, 20 CW, 30.5 R, 67.9, 543, 545, 546; 224/918

[56] References Cited

U.S. PATENT DOCUMENTS

| | | | |
|---|---|---|---|
| 1,739,780 | 12/1929 | Buhrke | 224/918 |
| 1,973,819 | 9/1934 | Link | 224/918 |
| 2,802,250 | 8/1957 | Klotz | 224/918 |
| 3,014,595 | 12/1961 | Bartmann | 224/918 |
| 3,141,221 | 7/1964 | Faulls, Jr. | 24/30.5 R |
| 4,449,310 | 5/1984 | Kline | 224/918 |
| 4,566,157 | 1/1986 | Packendorff | 24/543 |
| 4,784,305 | 11/1988 | Schoenberg | 224/918 |

FOREIGN PATENT DOCUMENTS

| | | | |
|---|---|---|---|
| 580190 | 7/1958 | Italy | 24/30.5 R |
| 1065634 | 4/1967 | United Kingdom | 24/20 CW |

Primary Examiner—Victor N. Sakran
Attorney, Agent, or Firm—William H. King

[57] ABSTRACT

A clamp for clamping a golf cart accessory 11 to an elongated element 21 on a golf cart. The clamp includes a resilient tubular member 22 (FIG. 6) attached to the accessory 11 (FIG. 2) that can be pressed onto elongated element 21. A locking clamp 31 (FIGS. 7 and 8) is slid over and around the ears 26 and 27 of the tubular member 22 to provide a secure fit.

8 Claims, 1 Drawing Sheet

GOLF CART ACCESSORY CLAMP

BACKGROUND OF THE INVENTION

The invention relates generally to golf cart accessories and more specifically concerns a method and apparatus for securely and readily attaching a golf accessory to a golf cart and for readily detaching the accessory from the golf cart.

Accessories attached to golf carts are not new. However, in the past the apparatuses for attaching the accessories to the golf carts have not been very successful. The clamps used have not been stable. That is, they turn and slide. To remedy the turning and sliding problems, nut and bolt attachments have been used. The nut and bolt attachments have several disadvantages. First, the nuts work loose and have to be continually tightened or they rust on the bolt. Second, holes have to be drilled which damage the golf carts. And third, the accessories are not readily attachable to or detachable from the golf carts without the use of tools.

It is therefore the primary object of this invention to provide a method and apparatus for securely and readily attaching an accessory to a golf cart and for readily detaching the accessory from the golf cart that does not damage the golf cart, does not require tightening loose nuts and does not require nuts and bolts that rust.

The prior art teaches the use of a clamp similar to the invention to clamp together two or more objects. However, it does not, nor is it capable, of readily attaching one object to another. It requires tools to engage and disengage the clamp. This prior art clamp was used on the early model Volkswagens.

Another object of this invention is to provide apparatus for securely and readily attaching an accessory to and from a golf cart that does not require the use of tools.

Other objects and advantages of this invention will become apparent hereinafter in the specification and drawings.

BRIEF DESCRIPTION OF THE INVENTION

The invention is an addition to a golf cart which consists essentially of an accessory and means for clamping the accessory to an elongated element on the golf cart. The clamping means includes a tubular member made from a flexible resilient material. A longitudinal strip is removed from the tubular member and the open ends are bent back to form two ears so that when the resulting opening of the tubular member is pressed onto the golf cart elongated element the tubular member will clamp onto the elongated element. The clamping means further includes a locking clamp for sliding over and around the ears pressing them toward each other and holding them in their pressed positions. This securely clamps the accessory to the elongated element and can be readily attached to or detached from the elongated element by sliding the locking clamp on or off.

DETAILED DESCRIPTION OF THE INVENTION

Figure 1:
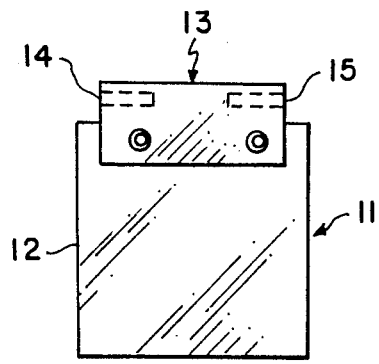
FIG. 1 is a front view of a golf cart accessory that is to be clamped to a golf cart.
Figure 2:
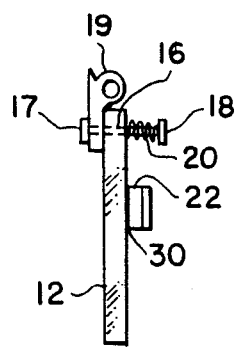
FIG. 2 is a side view of the golf cart accessory shown in FIG. 1.

Turning now to the embodiment selected for illustrating the invention, the number 11 in FIG. 1 designates a typical accessory that is desired to be attached to a golf cart. Accessory 11 includes a board 12 and a clamp 13 for clamping a score card to board 12. Two holes 14 and 15 are drilled in clamp 13 for holding two pencils, one in each end of the clamp. As can be seen in FIG. 2, clamp 13 consists of a rod 16 with stops 17 and 18 for mounting a score card holder 19 on the front of the board 12 and for mounting a spring 20 on the back of the board. Spring 20 is mounted in a compressed state to provide the holding power for holder 19. When it is desired to insert or remove a score card, the upper end of holder 19 is pushed to the right to further compress spring 20 and thereby provide an opening between the lower end of holder 19 and board 12.

Figure 3:
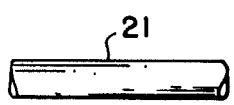
FIG. 3 is a side view of an elongated element on a golf cart to which an accesory is to be attached.

FIG. 3 discloses an elongated element 21 which is part of a golf cart, for example a handle, that it is desired to attach the accessory to. Alternatively, elongated element 21 can be an attachment to a golf cart for the sole purpose of supporting an accessory. Even though a cross-section of element 21 is shown as a circle it can have other cross-sections. For example, it can have the cross-section of an ellipse or any of several or many sided figures.

Figure 4:
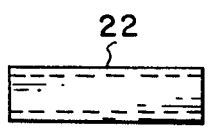
FIG. 4 is a view of a tubular material from which a tubular member is made.

The means for attaching the accessory 11 to elongated element 21 includes a tubular member 22, shown in FIG. 4, having an inside diameter approximately equal to or slightly smaller than the outside diameter of element 21. Tubular member 22 is made from any suitable material that is resilient and flexible to the extent that it can be flexed by a person's hand power. That is, it can be flexed by a person's fingers.

Figure 5:
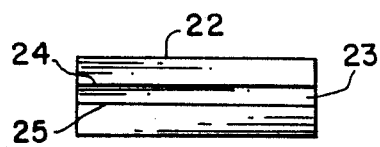
FIG. 5 is a view of the tubular material with a strip removed.
Figure 6:
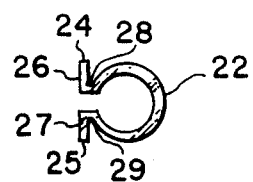
FIG. 6 is an end view of the tubular member.

As shown in FIG. 5, a longitudinal strip 23 is removed from tubular member 22, and the resulting open ends 24 and 25 are bent back, as shown in FIG. 6, to form ears 26 and 27 with grooves 28 and 29 between the ears and tubular member 22. The bend is made such that open ends 24 and 25 point in opposite directions along a line parallel to the vertical tangent of the outside surface of member 22. Consequently, when tubular member 22 is attached to board 12 at the tangent points, ears 26 and 27 will be parallel to board 12. As shown in FIG. 2, tubular member 22 is attached to board 12 by any suitable material 30 such as epoxy.

Now accessory 11 can be attached to elongated element 21 by pressing tubular member 22 onto element 21. This attachment is snug, but is not tight enough to prevent sliding and turning. The opening in the tubular member 22 to enable pressing the tubular member onto element 21 can be larger than that shown in FIG. 6.

Figure 7:
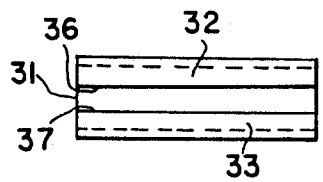
FIG. 7 is a front view of a locking clamp.
Figures 8, 9:
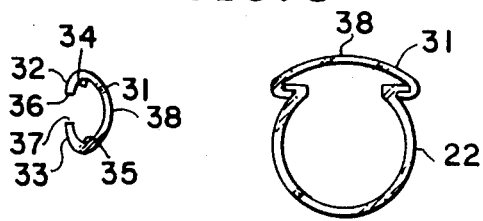
FIG. 8 is an end view of a locking clamp.
FIG. 9 is an end view showing the clocking clamp engaged with the tubular member.

To make a tighter fit to prevent sliding and turning of tubular element 22, a locking clamp means 31 as shown in FIGS. 7 and 8 is provided. Locking clamp means 31 is made from a suitable non-flexible material which is bent to form claws 32 and 33 with slightly rounded grooves 34 and 35 to slide over ears 26 and 27 of tubular element 22.

Claws 32 and 33 are formed such that their open ends 36 and 37 are the same distance apart as grooves 28 and 29 are when tubular member 22 is compressed, finger tight, against elongated element 21. Then locking clamp means 31 can slide over ears 26 and 27 thereby providing a tight fit of tubular member 22 to elongated element 21. When the finger pressure is released the resiliency of tubular member 22 will lock the clamp means into place. When it is desired to remove the locking clamp means 31, the finger pressure is again applied unlocking the clamp means thereby allowing it to be removed. FIG. 9 shows the locking clamp means 31 engaged with tubular member 22.

In an alternative and preferred embodiment of locking clamp means 31 the material used to make the clamp is semi-flexible and resilient. Consequently, when pressure is applied to the rounded crest 38 of the locking clamp by the fingers or palm of a hand the claws 32 and 33 spread or move away from each other thereby allowing the locking clamp to slide on or off the tubular member 22. With this embodiment of the locking clamp means 31 the locking clamp means can be slid on or off the tubular member 22 by applying hand pressure to either the tubular member 22 or the locking clamp means 31. The hand pressure applied to tubular member 22 can be applied directly or indirectly by pushing locking clamp means 31 onto tubular member 22.

Figure 10:
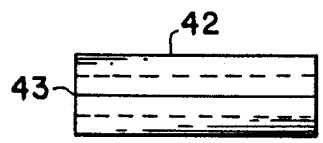
FIG. 10 is a front view of a tubular spacing element that can be placed over the elongated element.
Figure 11:
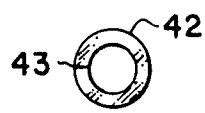
FIG. 11 is an end view of the spacing element shown in FIG. 10.

If there is any unwanted sliding or turning of tubular member 22 due to a slick outside surface of element 21 or a slick inside surface of tubular member 22 then any suitable anti-skid material can be deposited on these surfaces. Alternatively, as shown in FIGS. 10 and 11, a tubular section 42, for example rubber, with a cut 41 in it can be placed over element 21. This alternative also has the advantage that it can be used to match the surface of element 21 to the inside surface of tubular member 22. Consequently, many different sized elements 21 can be matched to one larger tubular member 22.

The advantages of this invention are numerous. It provides a means for attaching an accessory to a golf cart that is simple, inexpensive, easy to use, does not require tools and requires only finger power to operate. It is securely and readily attachable to a golf cart and it is readily detachable from the golf cart. In addition there is no damage done to the golf cart and when attached there is no slipping and sliding of the assembly.

The disclosed invention is the preferred embodiment. However, it is to be understood that other embodiments and variations of the invention can be made that will be within the scope of the invention as defined in the claims. For example, the grooves 34 and 35 in the locking clamp means are disclosed an equidistance from each other throughout the length of the clamp means. This distance could uniformly change thereby making the locking clamp means tapered. This would have the advantage of making it easier to start the sliding of the clamp means and it would apply a greater pressure. However, this greater pressure would not be uniform throughout the entire length of the clamp means. In the preferred embodiment the pressure is applied uniformly along the entire length of the clamp means. The strip 23 removed from tubular member 22 could be removed almost the full length of member 22 with a cut through the remainder to provide stops for locking clamp means 31. The ears on the tubular member could be made independently of the tubular member and then attached to the tubular member. Also a suitable material could be added to the ears making them thicker and more durable. In addition, locking lugs could be added at the ends of the ears for the locking clamp to rest on thereby applying pressure at the ends of tubular member 22.

What is claimed is:

1. An addition to a golf cart having an elongated element comprising:

an accessory;

means attached to said accessory, for readily and securely attaching said accessory to and for readily detaching said accessory from said elongated element;

said means comprising an elongated resilient tubular member with a longitudinal strip removed and with the resulting open ends shaped back to form two ears so that when the resulting opening of the tubular member is pressed onto said golf cart elongated element the tubular member will clamp onto said elongated element, and a locking clamp means, including two claws attached to each other for sliding over and around said ears when the ears are pressed toward each other to thereby hold the ears in approximately their pressed positions;

whereby said accessory is securely clamped to said elongated element and can be readily attached to and detached from the elongated element by pressing the ears together and sliding the locking clamp means on and off.

2. An addition to a golf cart according to claim 1 wherein said two claws are attached together with a non-flexible material.

3. An addition to a golf cart according to claim 1 wherein said two claws are attached together with a semi-flexible resilient material with a crest in it whereby when finger or hand pressure is applied to said crest the two claws will move away from each other thereby allowing the locking clamp means to slide on or off said tubular member.

4. An addition to a golf cart according to claim 1 wherein said two claws are an equal distance apart throughout the length of the locking clamp means whereby when the locking clamp means is engaged equal pressure is applied to said ears throughout the length of said tubular member.

5. An addition according to claim 1 including a slide resistant material between said elongated element and said tubular member to prevent sliding and turning of said tubular member when engaged with said elongated element.

6. An addition according to claim 5 wherein said slide resistant material is an insert whereby the thickness of the said insert can be selected to match the elongated element to the tubular member.

7. A method for attaching an accessory to a golf cart having an elongated element comprising the steps of:

selecting an elongated resilient tubular member with a longitudinal strip removed;

shaping back the resulting open ends of said tubular member to form two ears;

attaching said tubular member to said accessory;

pressing said tubular member onto said elongated element;

pressing said ears together; and sliding a locking clamp over and around said ears to hold the ears in their pressed positions;

whereby said accessory is securely clamped to said elongated element and can be readily detached by pressing the ears together and sliding the locking clamp off.

8. A method for attaching an accessory to a golf cart having an elongated element comprising the steps of:

selecting an elongated resilient tubular member with a longitudinal strip removed;

shaping back the resulting open ends of said tubular member to form two ears;

attaching said tubular member to said accessory;

pressing said tubular member onto said elongated element;

applying hand pressure to the crest of a semi-flexible resilient material attaching two claws thereby moving the claws away from each other; and sliding said two claws over and around said two ears;

whereby when the hand pressure is released the tubular member is locked to said elongated element and when hand pressure is again applied the said two claws can be readily slid from around said two ears.

* * * * *